(12) United States Patent
Zagula

(10) Patent No.: US 11,409,041 B2
(45) Date of Patent: Aug. 9, 2022

(54) CABLE STRIPPING TOOL WITH OFFSET ROLLER SYSTEM

(71) Applicant: Ripley Tools, LLC, Cleveland, OH (US)

(72) Inventor: Tadeusz Zagula, Newington, CT (US)

(73) Assignee: Ripley Tools, LLC, Cleveland, OH (US)

(*) Notice: Subject to any disclaimer, the term of this patent is extended or adjusted under 35 U.S.C. 154(b) by 352 days.

(21) Appl. No.: 16/715,615

(22) Filed: Dec. 16, 2019

(65) Prior Publication Data
US 2020/0192029 A1 Jun. 18, 2020

Related U.S. Application Data

(60) Provisional application No. 62/779,877, filed on Dec. 14, 2018.

(51) Int. Cl.
*G02B 6/245* (2006.01)
*B25G 1/10* (2006.01)

(52) U.S. Cl.
CPC .............. *G02B 6/245* (2013.01); *B25G 1/102* (2013.01)

(58) Field of Classification Search
CPC ....... G02B 6/245; G02B 6/4497; B25G 1/102
See application file for complete search history.

(56) References Cited

U.S. PATENT DOCUMENTS

| | | | |
|---|---|---|---|
| 2,830,366 A | 4/1958 | Chisena | |
| 3,453,917 A | 7/1969 | Perry | |
| 3,665,603 A * | 5/1972 | Bilbrey | H02G 1/1231 30/90.7 |
| 3,722,092 A | 3/1973 | Lukas | |
| 3,826,001 A * | 7/1974 | Bilbrey | H02G 1/1226 30/142 |
| 4,489,490 A | 12/1984 | Michaels | |

(Continued)

FOREIGN PATENT DOCUMENTS

| | | |
|---|---|---|
| EP | 1953884 A1 | 8/2008 |
| WO | 198301350 A1 | 4/1983 |

OTHER PUBLICATIONS

Ripley Miller ACS-2, 7 pages.
International Search Report—dated Feb. 20, 2020.
Written Opinion—dated Feb. 20, 2020.

*Primary Examiner* — Andrew Jordan
(74) *Attorney, Agent, or Firm* — DeLio Peterson & Curcio LLC; Brian G. Schlosser

(57) ABSTRACT

A cable stripping tool for stripping the outer jacket of a cable having a length. The tool includes a tool frame having an elongated opening and a cable support disposed on the tool frame including at least one support surface for maintaining the cable in a relative position on the tool. The tool includes a roller assembly having an offset block movable along the elongated opening, a roller wheel rotatingly attached to an end of the block member adjacent the cable support and a loading knob attached to an opposite end of the offset block as the roller wheel. The tool includes a blade having a cutting edge extendable from the cable support surface toward the cable. The blade cutting edge may be rotatable between a first direction parallel to the cable length, a third direction perpendicular to the cable length and a second position between the first and third position.

26 Claims, 13 Drawing Sheets

(56) References Cited

U.S. PATENT DOCUMENTS

| | | | |
|---|---|---|---|
| 6,308,417 B1* | 10/2001 | Ducret | H02G 1/1231 |
| | | | 30/90.9 |
| D505,056 S | 5/2005 | Tarpill | |
| 2003/0188432 A1 | 10/2003 | Temple | |
| 2009/0013535 A1* | 1/2009 | Derancourt | H02G 1/1231 |
| | | | 30/90.6 |
| 2013/0042483 A1 | 2/2013 | Ducret | |
| 2020/0192029 A1* | 6/2020 | Zagula | G02B 6/4497 |
| 2020/0373745 A1* | 11/2020 | Galindo Gonzalez | |
| | | | H02G 1/1239 |

* cited by examiner

CABLE STRIPPING TOOL WITH OFFSET ROLLER SYSTEM

BACKGROUND OF THE INVENTION

1. Field of the Invention

The present invention relates to a cable stripper for accessing transmission strands in a heavy jacket or armored cable.

2. Description of Related Art

Fiber optic cable like the cable shown in FIG. 32 requires many formats to protect the inner fiber. The outer sheath 2 (jacket) protects the inner glass fiber 5 from damage and can be used in many applications. Most lighter duty applications use a form of PVC jacket material. The proliferation of fiber technology has created a need for heavier walled outer sheaths, strength members 6 made from fiberglass or metal armored layers 8 to ensure the internal fibers 5 and buffer tube 4 cable components are not damaged when installed in walls, ducts and even underground applications.

During cable installation, network expansion or servicing, the needs arise to be able to access the inner fiber and buffer tubes by cutting though the outer sheath and additional protective layers (if present). This cutting requirement can be in the form of an end strip (end of cable) or mid-span (mid-section without disturbing the ends of the cable).

Tools currently on the market are designed for lighter PVC jackets. These tools have weak springs and thin cutting blades and rely on the light duty application to work properly. The cable is not fully retained during cutting and the tool will not work with metal or very heavy jackets.

Other tools in the market are aimed at heavier wall and armored jackets (see below). These tools have heavier blades and mechanical assist to help the blade penetrate though the heavy wall or armor. These tools require different wheel diameters to cover the common cable diameter range. The wheels adjust to accommodate different diameters but are difficult to maintain constant and repeatable clamping pressure. The blade moves between the ring and longitudinal positions, but do not have a spiral position which will allow for a means of removing the outer jacket as a spiral remnant.

These tools are not optimized for installers to use with gloves since the blade adjust requires a screwdriver or some other means to adjust the blade height.

SUMMARY OF THE INVENTION

Bearing in mind the problems and deficiencies of the prior art, it is therefore an object of the present invention to provide an improved outer sheath cutting tool for heavy fiber optic jackets (or other heady cables employing copper or other core) and outer layers.

It is another object of the present invention to provide a tool which adds enhanced ergonomic features, enhanced cable clamping and wider application range in a single platform.

Still other objects and advantages of the invention will in part be obvious and will in part be apparent from the specification.

The above and other objects, which will be apparent to those skilled in the art, are achieved in the present invention which is directed to a cable stripping tool for stripping the outer jacket of a cable having a length. The tool includes a tool frame having an elongated opening and a cable support disposed on the tool frame, the cable support including at least one support surface for maintaining the cable in a relative position when the tool is in the stripping position. The stripping tool 20 includes a roller assembly having an offset block movable along the elongated opening, a roller wheel rotatingly attached to an end of the block member adjacent the cable support and a loading knob attached to an opposite end of the offset block as the roller wheel. The stripping tool includes a blade having a cutting edge extendable from the cable support surface toward the cable. The blade cutting edge may be rotatable between a first direction parallel to the cable length, a third direction perpendicular to the cable length and a second position between the first and third position. The stripping tool may include a position lever secured to the blade for changing the blade cutting direction, the position lever movable between a first position whereby the cable jacket is cut along the cable axis, a second position whereby the cable jacket is cut in a spiral direction along the length of the cable and a third position whereby the cable jacket is cut straight along the length of the cable. The tool frame may include a plurality of notches to secure the position lever in a plurality of locking positions including the first position, the second position and the third position. The blade cutting edge may be a hyperbolic edge and the blade may include a piercing tip centered along the hyperbolic edge, the piercing tip capable of initially piercing the cable jacket and the hyperbolic edge slicing the cable jacket as the cable is moved with respect to the cable support. The roller assembly may be capable of being moved away from the cable support surface for loading the cable in the tool support surface and, once the cable is loaded in the cable support, the roller assembly is capable of being released from the position away from the cable support surface whereby the roller wheel secures the cable in position. The stripping tool may include a spring which urges the roller assemble toward the cable support. Loosening the loading knob may cause a gap between the loading knob and the tool frame, allowing the offset block to wobble in the elongated slot and wherein upon release of the loading knob secures the cable between the cable support and the roller and subsequent tightening of the loading knob further increase the pressure placed on the cable from the cable support and roller. The stripping tool may include a blade driving knob attached at a first end of the tool frame for moving the blade from an extended position to a retracted position or for moving the blade from the retracted position to the extended position. The stripping tool may include a blade height adjustment knob for adjusting the distance the blade extends from the cable support toward the cable. The stripping tool may include a handle for holding, pulling or rotating the cable stripping tool attached to a second end of the tool frame opposite the first end of the tool frame. The stripping tool may include a blade driving knob attached at a first end of the tool frame for moving the blade from a retracted position to a cutting position and a blade height adjustment knob for adjusting the distance the blade extends from the cable support toward the cable.

Another aspect of the invention is directed to a cable stripping tool for stripping the outer jacket of a cable having a length. The stripping tool includes a tool frame having an elongated opening and a cable support disposed on the tool frame, the cable support including at least one support surface for maintaining the cable in a relative position when the tool is in the stripping position. The stripping tool includes a roller assembly having an offset block movable along the elongated opening, a roller wheel rotatingly attached to a wheel shaft having a first axis along the wheel shaft length, the wheel shaft extending from one end of the offset block and extending adjacent to the cable support and a loading knob rotatably attached to a second end of the offset block opposite the one end. The stripping tool includes a blade having a cutting edge extendable from the cable support surface toward the cable wherein the offset block may wobble when the loading knob is in a loosened position and the offset block is secured along the elongated slot when the loading knob is in a tightened position.

Another aspect of the invention is directed to a cable stripping tool for stripping the outer jacket of a cable having a length. The stripping tool includes a tool frame having an elongated opening and a cable support disposed on the tool frame for axially securing the cable to the tool frame. The stripping tool includes a blade having a cutting edge extendable from the cable support surface toward the cable and a roller assembly movable along the elongated opening and a roller wheel rotatingly attached to an end of the shaft adjacent the cable support. The roller wheel includes a first and second conical drum spaced apart and axially aligned, each conical drum having an outer end having an outer diameter and an inner end having an inner diameter smaller than the first outer diameter and a conical roller surface between the first and second end and a cylindrical relief surface disposed between the inner end of the first and second conical drum, the cylindrical relief surface having a relief diameter smaller than the second conical surface diameter. The relief surface prevents the blade from contacting the roller when the blade is in the extended position. A large diameter cable secured in the stripping tool contacts the conical roller surface of the first and second conical drum and a small diameter cable secured in the stripping tool contacts an edge of the first and second conical drum inner end.

Another aspect of the invention is directed to a cable stripping tool for stripping the outer jacket of a cable having a length. The tool includes a tool frame having an elongated opening and a cable support disposed on the tool frame, the cable support including at least one support surface for maintaining the cable in a relative position when the tool is in the stripping position. The stripping tool includes a roller assembly movable along the elongated opening, a roller wheel rotatingly attached to an end of a roller block adjacent the cable support and a blade having a cutting edge extendable from the cable support surface toward the cable. The blade is rotatable to a first position, second position or third position wherein in the first position allows the blade to cut a jacket on the cable in a linear direction along the length of the cable, the second position allows the blade to cut the jacket in a spiral direction and the third position allows the blade to cut the jacket along the diameter of the cable. The cable stripping tool may include a loading knob attached to an opposite end of the roller block as the roller wheel.

Another aspect of the invention is directed to method for stripping the outer jacket from a cable comprising providing a cable stripping tool having a tool frame, an elongated opening on the tool frame, a cable support disposed on the tool frame, the cable support including at least one support surface for maintaining the cable in a relative position when the tool is in the stripping position, a roller assembly having an offset block movable along the elongated opening and a roller wheel rotatingly attached to a wheel shaft having a first axis along the wheel shaft length, the wheel shaft extending from one end of the offset block and extending adjacent to the cable support and a loading knob rotatably attached to a second end of the offset block opposite the one end, the stripping tool including a blade having a cutting edge extendable from the cable support surface toward the cable, wherein the offset block may wobble when the loading knob is in a loosened position and the offset block is secured along the elongated slot when the loading knob is in a tightened position. The method includes providing a cable for stripping a portion of the outer jacket therefrom and ensuring the loading knob is in a loosened position wherein a gap is formed between the loading knob and the tool frame and the roller assembly is movable along the elongated slot. The method includes urging the loading knob in a direction away from the cable support, placing a cable against the cable support and releasing the loading knob to allow a compression spring to force the roller assembly against the cable jacket after which the spring continues to urge the offset block to a slightly rotated position. The method includes tightening the loading knob to rotate the roller assembly back to a perpendicular position with respect to the tool frame, further tightening the roller against the cable, extending the blade toward the cable and moving the stripping tool with respect to the cable until the desired cut is made in the cable. The method includes loosening the loading knob to release the roller assembly from the secured position and removing the cable from the stripping tool; and removing a portion of the outer jacket from the cable. The stripping tool may include a position lever secured to the blade for changing the blade cutting direction, the position lever movable between a first position whereby the cable jacket is cut along the cable axis and a third position whereby the cable jacket is cut in a rotational direction along the diameter of the cable. The position lever may be additional rotatable to a second position between the first and third positions whereby the cable jacket is cut in a spiral direction along the length of the cable.

Another aspect of the invention is directed to a method for using a cable stripping tool for stripping a cable comprising providing a cable stripping tool having a tool frame with an elongated opening, a cable support disposed on the tool frame, the cable support including at least one support surface for maintaining the cable in a relative position when the tool is in the stripping position, a roller assembly including a offset block movable along the elongated opening, a roller wheel rotatingly attached to an end of the shaft adjacent the cable support, a loading knob attached to an opposite end of the shaft for securing the roller assembly in a position along the elongated opening and a spring for biasing the roller in an active position against the cable, the roller assembly movable from a rest position to a loading position and to a stripping position and a blade having a cutting edge extendable from the cable support surface toward the cable, the blade cutting edge movable from a first direction parallel to the cable length to a second direction parallel to the cable length and at least one intermediate position between the first and second positions, a position lever to the blade for changing the blade cutting direction, the position lever movable to a first direction whereby the cable is cut along the cable axis, to a second position whereby the cable is cut in a spiral direction along the length of the cable and to a third position whereby the cable is cut along a circumference of the cable, a blade driving knob attached at a first end of the tool frame for moving the blade from a retracted position to a cutting position, a blade height adjustment knob for adjusting the distance the blade extends from the cable support toward the cable and a handle for holding, pulling or rotating the cable stripping tool attached to a second end of the tool frame opposite the first end of the tool frame. The method includes ensuring the blade is in a proper height position for slitting the cable jacket, ensuring the blade is in the retracted position and ensuring the loading knob is in a loosened position wherein a gap is formed between the knob and the tool frame and the roller assembly is movable along the elongated slot. The method includes urging the loading knob in a direction away from the cable support, placing a cable in against the cable support and releasing the loading knob to allow the spring to force the roller assembly against the cable jacket after which the spring continues to move the offset block to the end of the elongated slot nearest the cable support while maintaining the roller against the cable, slightly rotating the roller assembly. The method includes tightening the loading knob to rotate the roller assembly back to a perpendicular position with respect to the tool frame, further tightening the roller against the cable, ensuring the position lever is in a position to cut the cable jacket in the desired direction and rotating or pulling the stripping tool with respect to the cable until the desired cut is made in the cable. The method includes loosening the loading knob to release the roller assembly from the secured position and removing the cable from the stripping tool. The step of ensuring the position lever is in a position to cut the cable jacket in the desired direction and the step of ensuring the blade is in a proper height position for slitting the cable jacket may be performed at any point before rotating or pulling the stripping tool with respect to the cable until the desired cut is made in the cable.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE EMBODIMENT(S)

In describing the embodiment of the present invention, reference will be made herein to FIGS. 1-31 of the drawings in which like numerals refer to like features of the invention.

Figure 1:
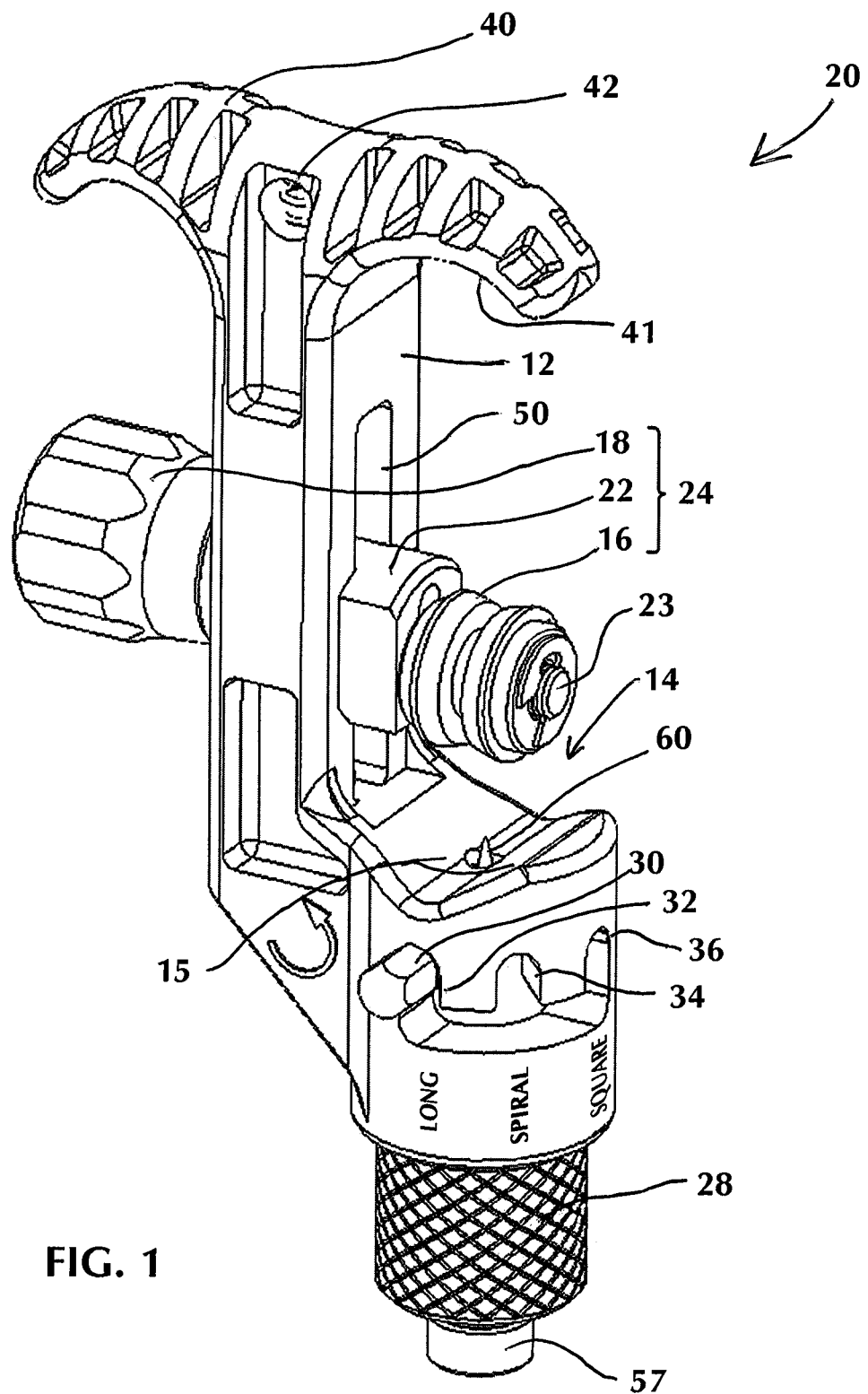
FIG. 1 is a front right top perspective view of a Cable Stripping Tool according to the present invention.
Figure 3:
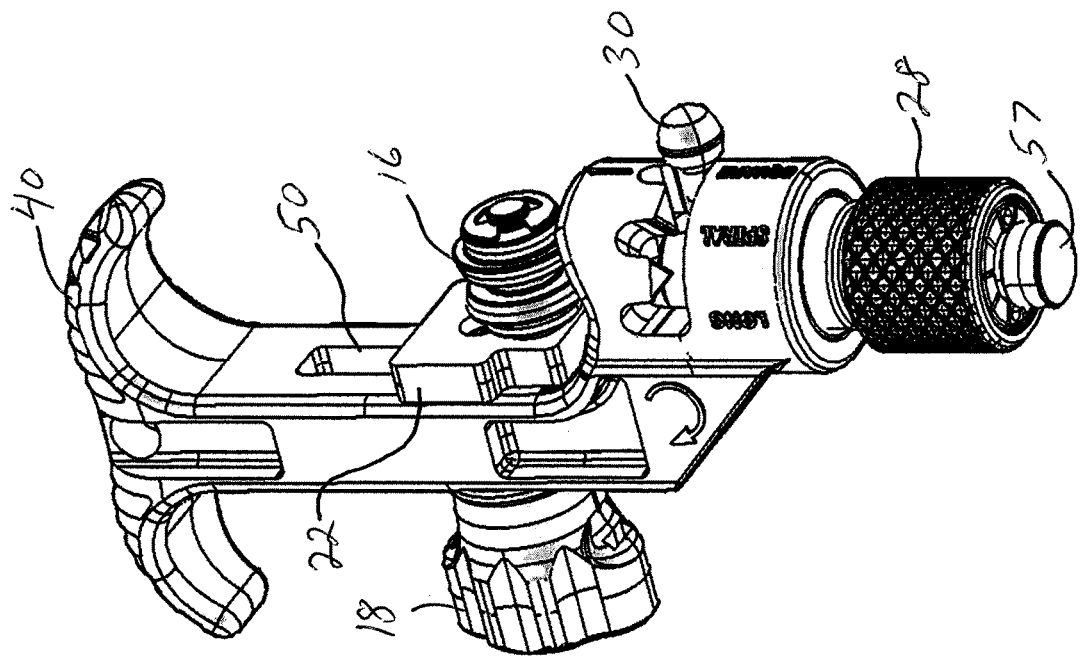
FIG. 3 is a front right bottom perspective view of the Cable Stripping Tool shown in FIG. 1.
Figure 2:
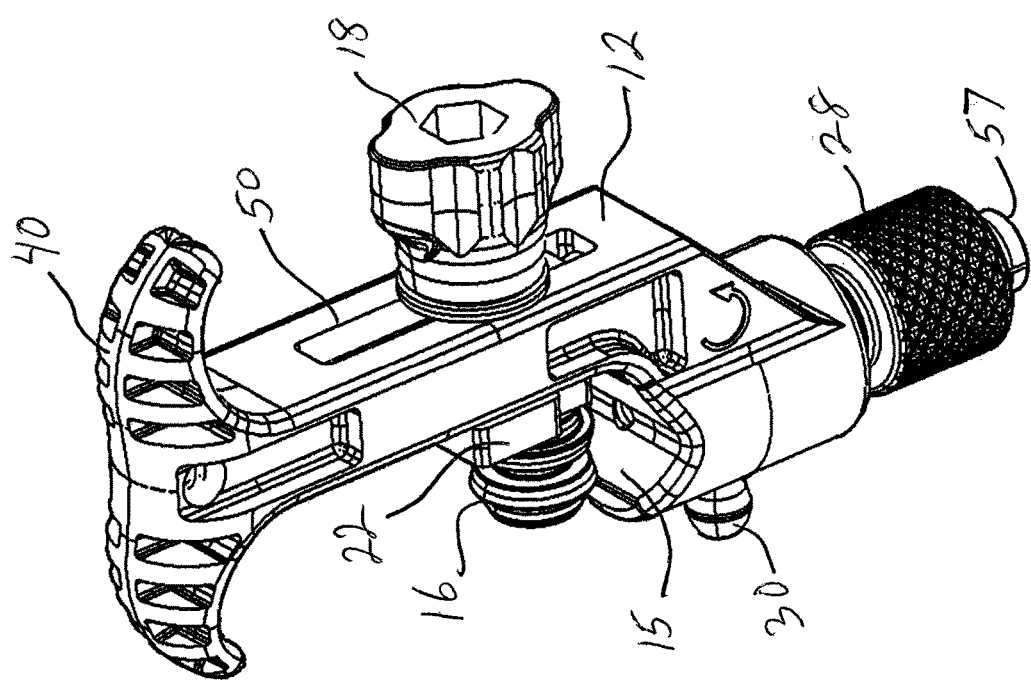
FIG. 2 is a rear left top perspective view of the Cable Stripping Tool shown in FIG. 1.
Figure 5:
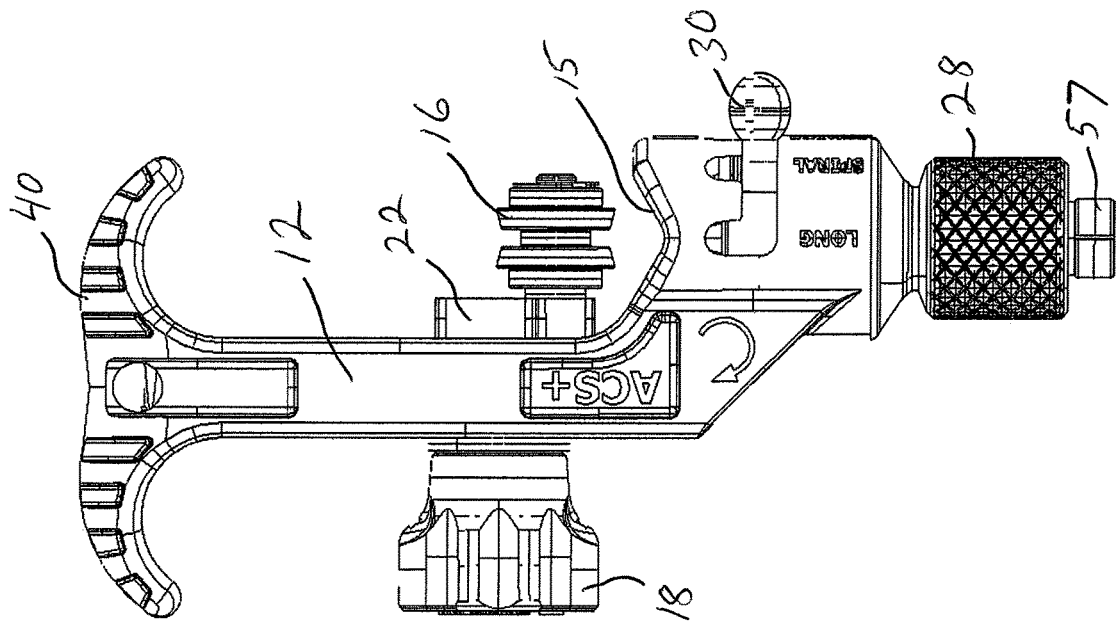
FIG. 5 is a rear elevational view of the Cable Stripping Tool shown in FIG. 1.
Figure 4:
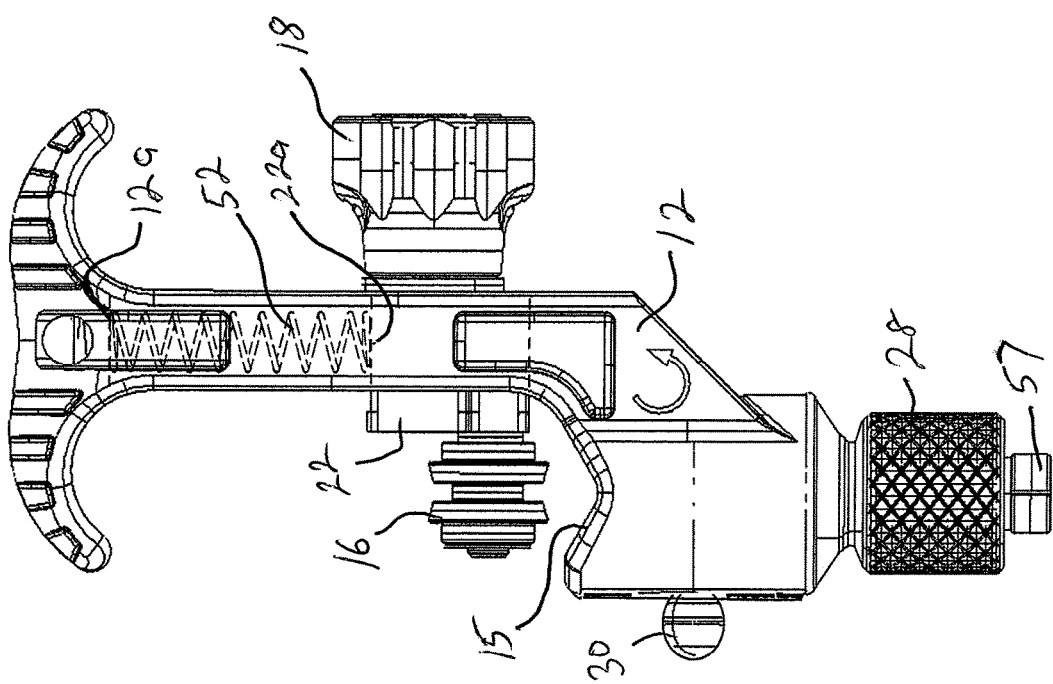
FIG. 4 is a front elevational view of the Cable Stripping Tool shown in FIG. 1.
Figure 7:
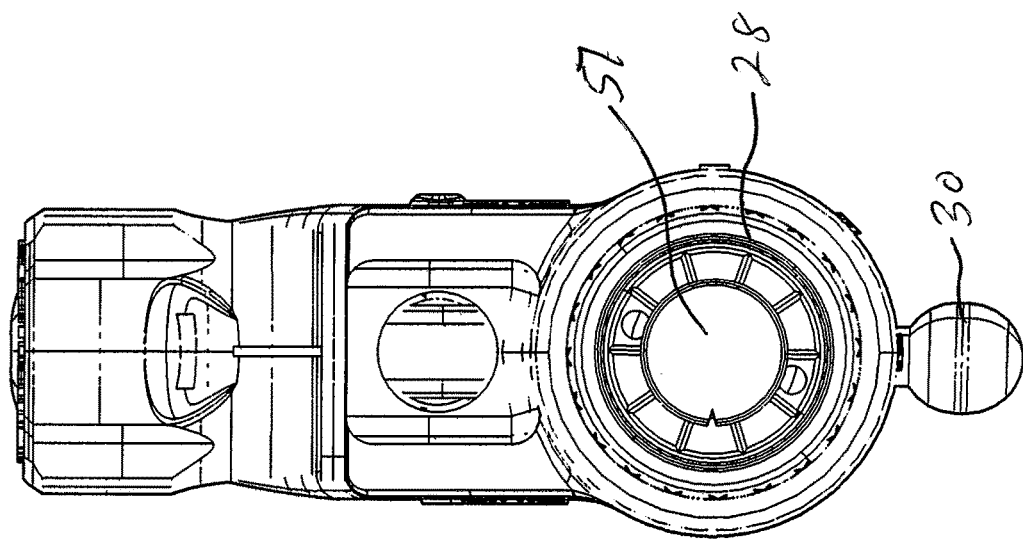
FIG. 7 is a bottom plan view of the Cable Stripping Tool shown in FIG. 1.
Figure 6:
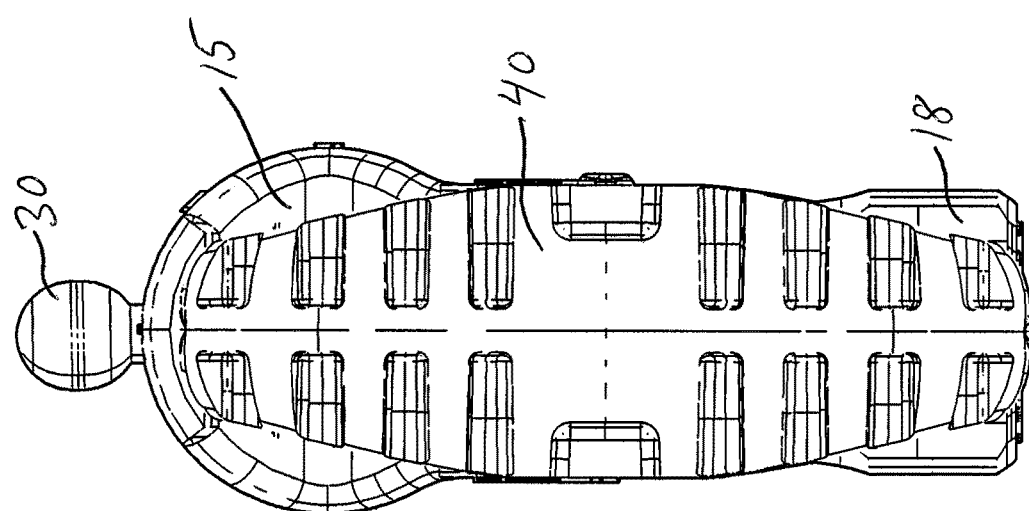
FIG. 6 is a top plan view of the Cable Stripping Tool shown in FIG. 1.
Figure 9:
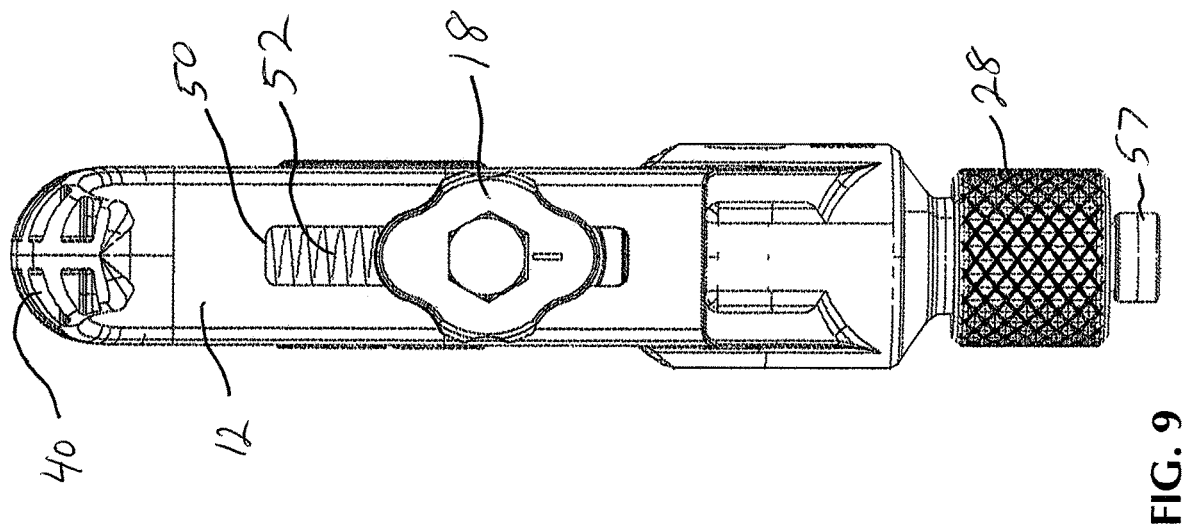
FIG. 9 is a left elevational view of the Cable Stripping Tool shown in FIG. 1.
Figure 8:
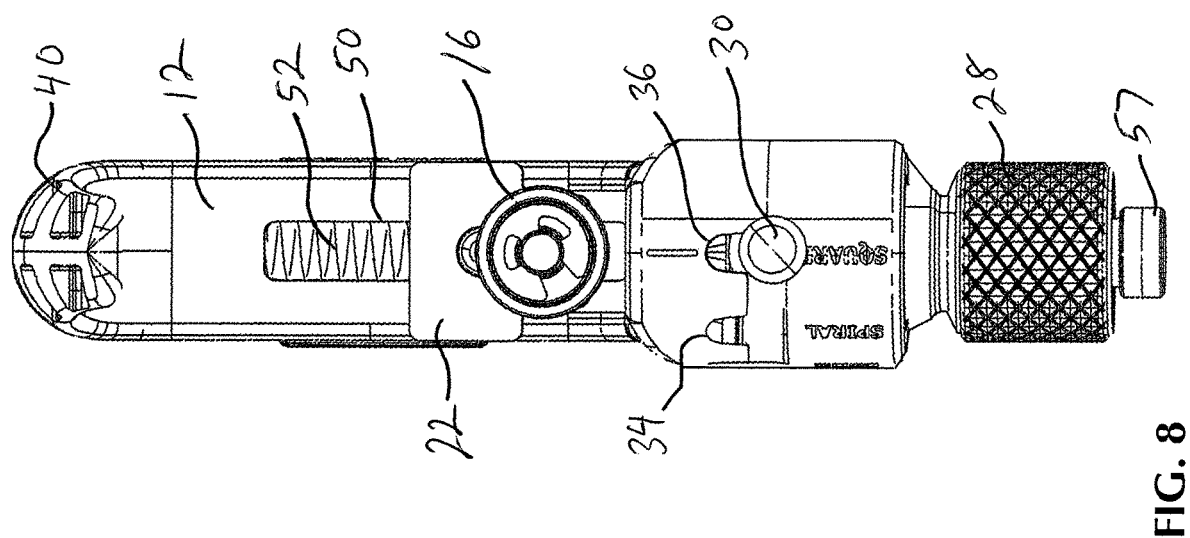
FIG. 8 is a right elevational view of the Cable Stripping Tool shown in FIG. 1.

In one embodiment of the present invention shown in FIGS. 1-9, the stripping tool includes a tool body or tool frame 12 having an elongated opening 50 and a cable support 14 disposed on the tool frame 12, the cable support 14 including at least one support surface 15 for maintaining the cable in a relative position when the tool 20 is in the stripping position. The stripping tool 20 includes a roller assembly 24 having an offset block 22 movable along the elongated opening 50 and a roller wheel 16 rotatingly attached to an end of a first roller wheel shaft 23 secured to the offset block 22, the first end of the roller wheel shaft adjacent the cable support 14. As shown in FIG. 4, the roller assembly 24 includes a loading knob 18 rotatingly attached to a loading shaft 25 for securing the roller assembly 24 in a position along the elongated opening 50 and a spring 52 for biasing the roller 16 in an active position against the cable. The spring 52 includes a first spring end disposed adjacent a top surface of the offset block 22 and a second spring end disposed adjacent an inner surface 12a of the frame 12. The roller assembly 24 is movable from a rest position to a loading position and to a stripping position. The stripping tool 20 includes a blade 60 shown in FIGS. 13-15 having a cutting edge 64 extendable from the cable support surface toward the cable. The blade cutting edge 64 is movable (rotatable) from a first direction parallel to the cable length to a second direction parallel to the cable length and at least one intermediate position between the first and second positions.

Figure 11:
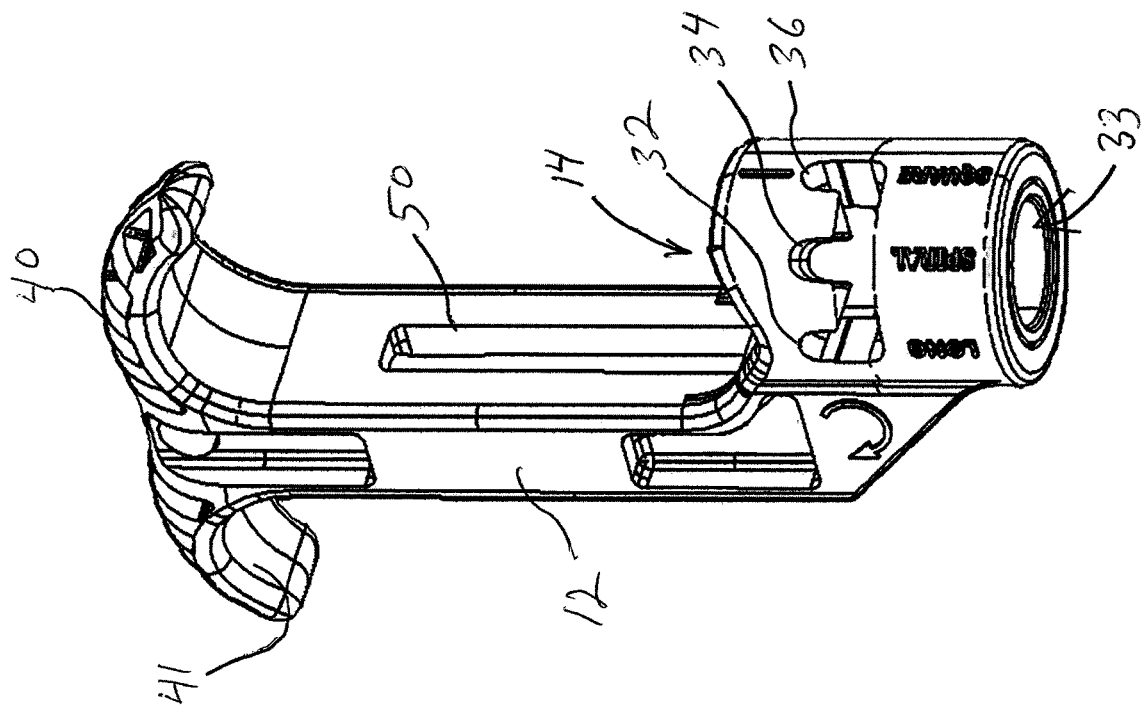
FIG. 11 is a bottom right front perspective view of the cable stripping tool frame according to the present invention.
Figure 10:
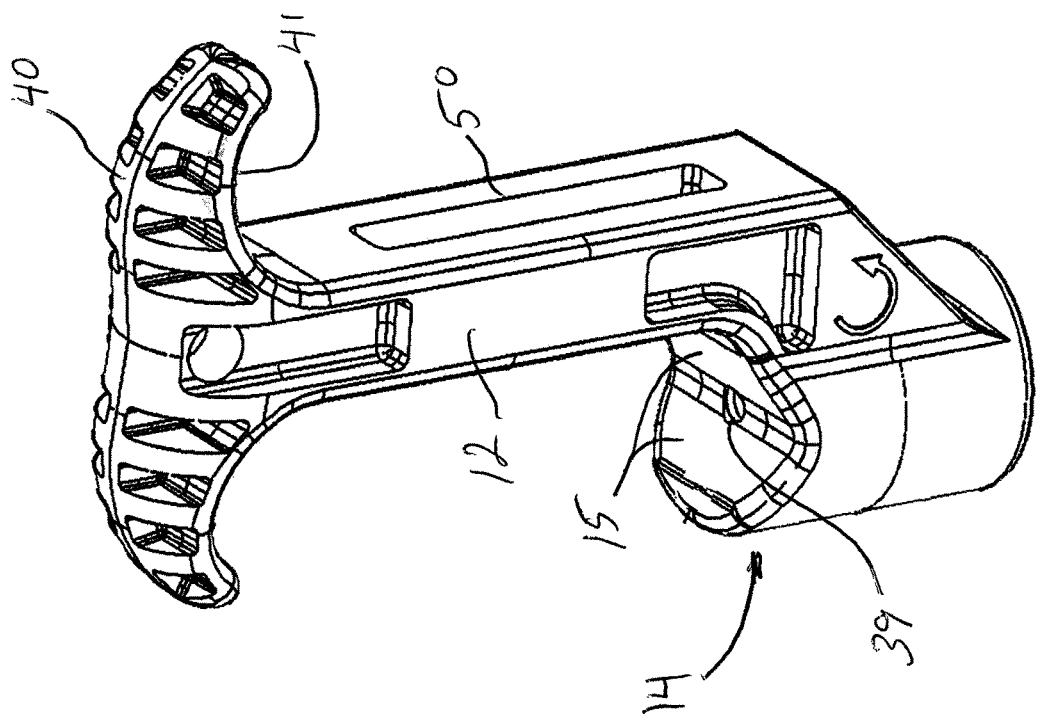
FIG. 10 is a top rear left perspective view of the cable stripping tool frame according to the present invention.
Figure 32:
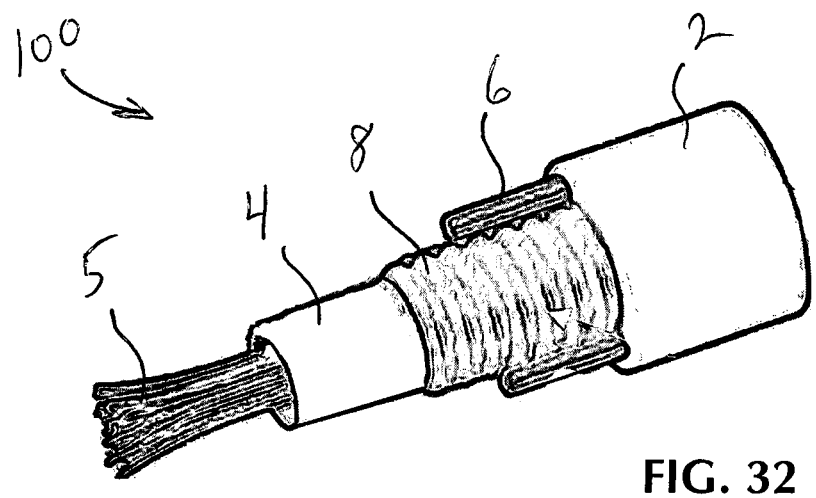
FIG. 32 shows one example of a fiber optic cable for stripping using the invention shown in FIGS. 1-31.

The tool body or frame 12 shown in FIGS. 10 and 11 ergonomically provides a T-handle or handle 40 for longitudinal cutting. The handle 40 includes a finger ring support 41 for rotational square or spiral cutting. The elongated opening 50 is disposed on the frame 12 between the handle 40 and the cable support 14. Disposed adjacent the cable support 14 are a first notch 32 for positioning the blade 60 for a longitudinal cut along the cable, a second notch 34 for positioning the blade 60 for a spiral cut along the cable and a third notch 36 for positioning the blade 60 for a square cut around the cable.

Figure 12:
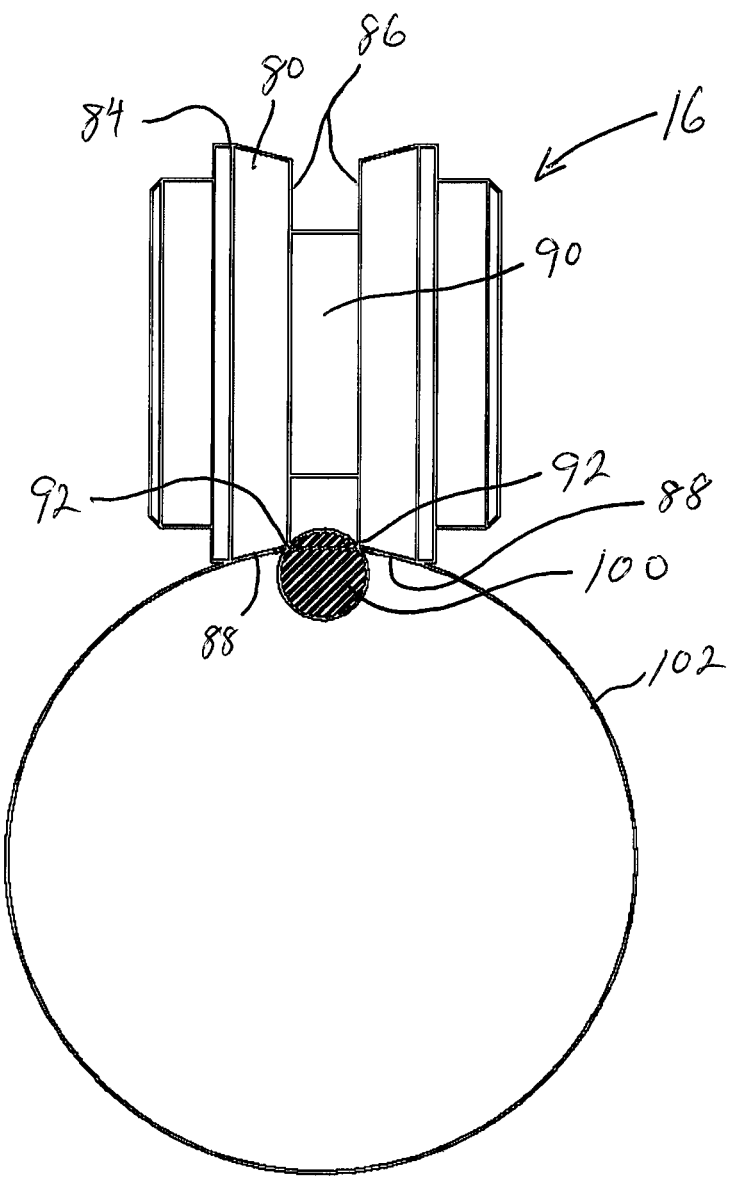
FIG. 12 is a front elevational view of the roller with respect to both a large diameter cable and a small diameter cable.
Figure 13:
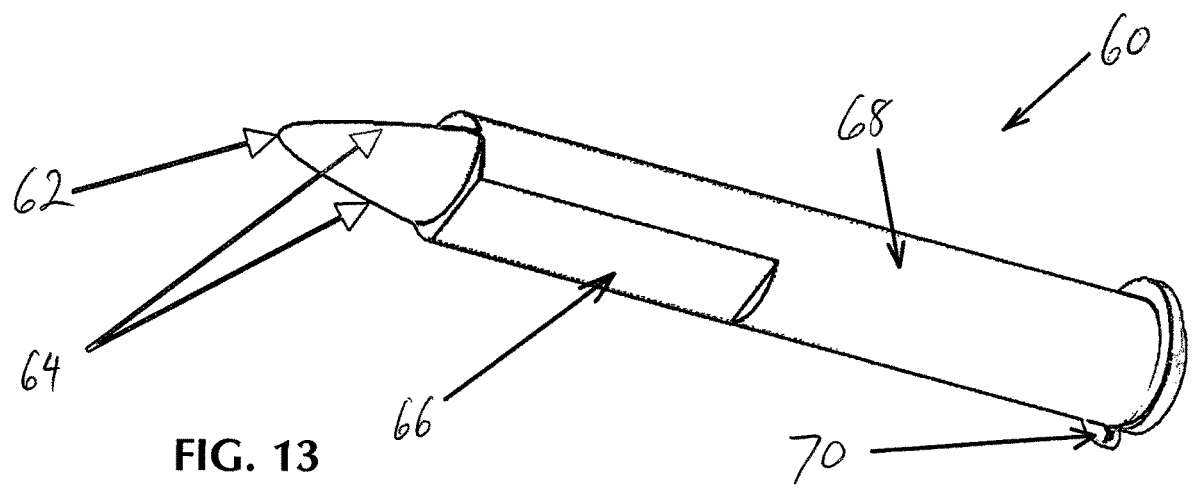
FIG. 13 is a perspective view of the cable stripping tool blade according to the present invention.
Figures 14, 15:
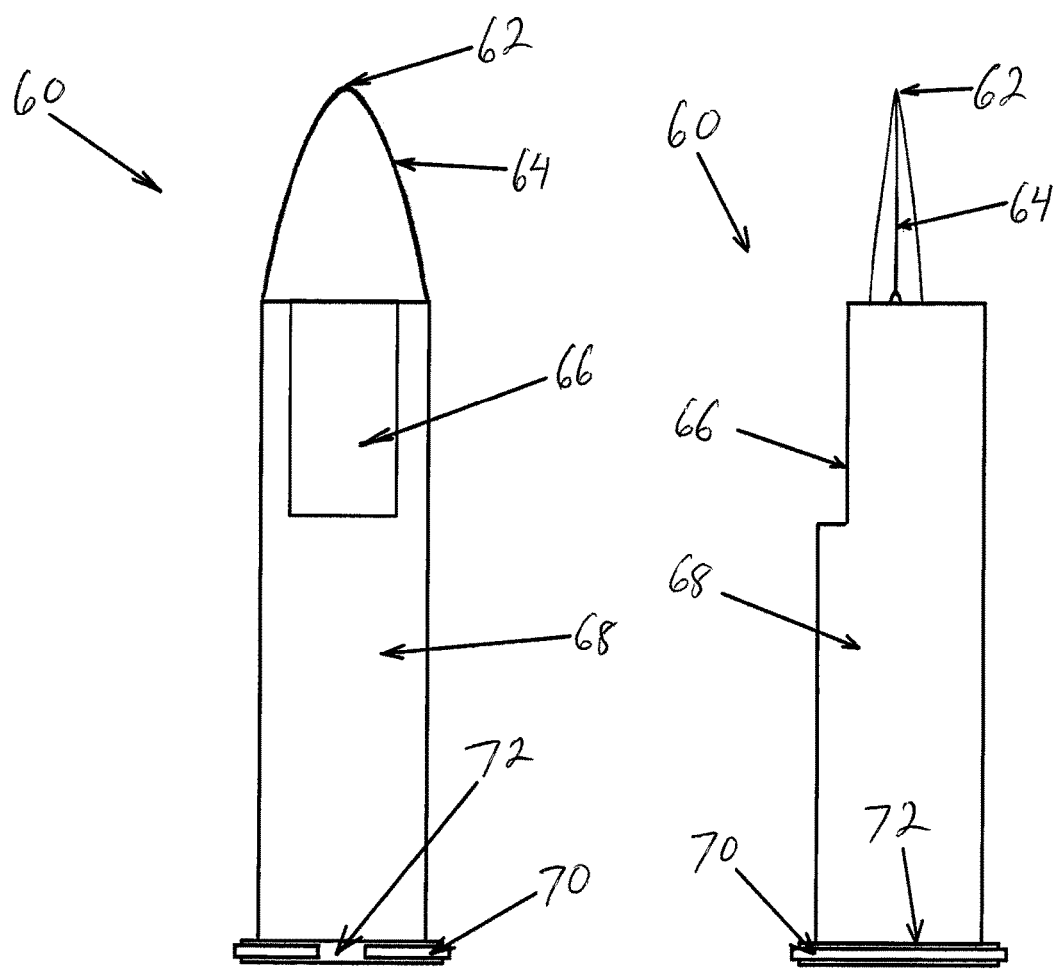
FIG. 14 is a front elevational view of the cable stripping tool blade shown in FIG. 13.
FIG. 15 is a side elevational view of the cable stripping tool blade shown in FIG. 13.

The roller is shown in FIG. 12 with respect to both a large diameter cable 102 and a small diameter cable 100. The roller 16 includes first and second conical drums 80, 82 spaced apart and axially aligned, each conical drum 80,82 having an outer end 84 having an outer diameter and an inner end 86 having an inner diameter smaller than the first outer diameter and a conical roller surface 88 between the outer end 84 and inner end 86. The roller 16 includes a cylindrical relief surface 90 disposed between the inner end 86 of the first and second conical drum 80, 82, the cylindrical relief surface 90 having a relief diameter smaller than the second conical surface diameter. The relief surface 90 prevents the blade 60 from contacting the roller 16 when the blade 60 is in the extended position. A large diameter cable 102 secured in the stripping tool contacts the conical roller surfaces 88 of the first and second conical drums 80, 82 and a small diameter cable 100 secured in the stripping tool 20 contacts an edge 92 of the first and second conical drum inner end 86.

The stripping tool blade 60 as shown above and in FIGS. 13-15 of the drawings includes a cylindrical blade body 68 and a flat alignment surface 66 for positioning the blade 60 in the stripping tool. The blade 60 includes a retaining ring groove 72 at one end of the blade 60 and a piercing tip 62 at the opposite end of the blade 60. A retaining ring 70 is removable from the retaining ring groove 72 for removal and securing of the blade 60 in the stripping tool 20. A blade cutting edge 64 is a hyperbolic edge including the piercing tip 62 centered along the hyperbolic cutting edge 64. The piercing tip 62 is capable of initially piercing the cable jacket 2 and the hyperbolic edge 64 slicing the cable jacket 2 as the cable 100 is moved with respect to the cable support 14.

Figure 16:
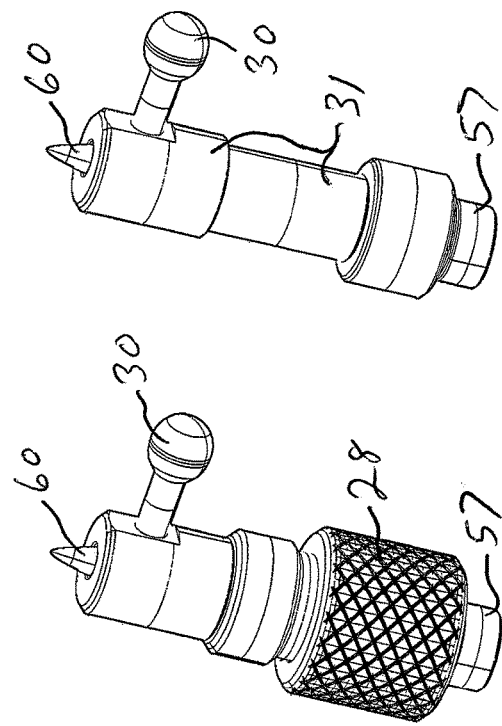
FIG. 16 is a perspective view of the roller assembly according to the present invention.
Figure 18:
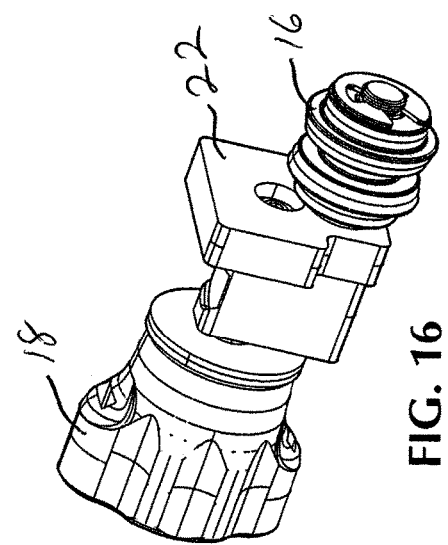
FIG. 18 is a perspective view of the blade driving assembly according to the present invention.
Figure 19:
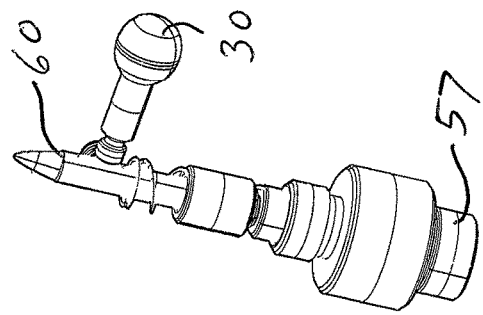
FIG. 19 is a perspective view of the blade driving assembly shown in FIG. 18 with the driving know and knob bushing removed.
Figure 20:
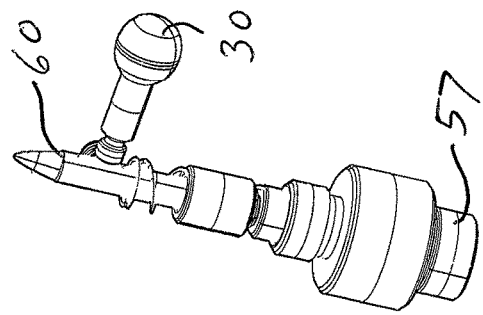
FIG. 20 is a perspective view of the blade driving assembly shown in FIG. 18 with the driving know, knob bushing and blade assembly collar removed.
Figure 17:
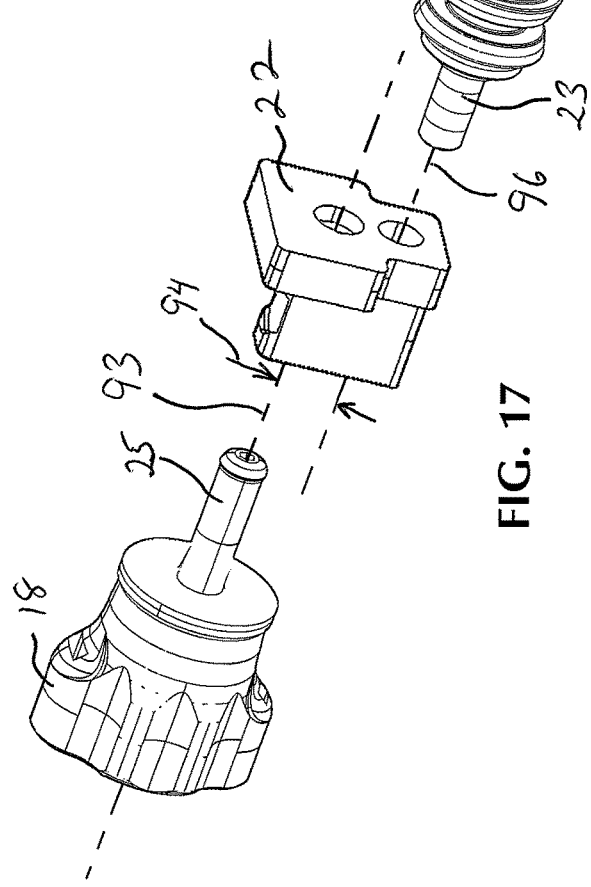
FIG. 17 is an exploded perspective view of the roller assembly shown in FIG. 16.
Figure 25:
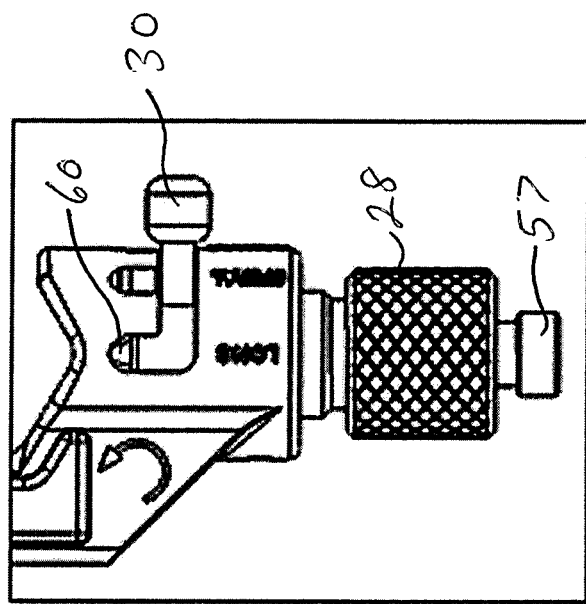
FIG. 25 is front elevational view of the blade and blade driving knob in the loading position.
Figure 24:
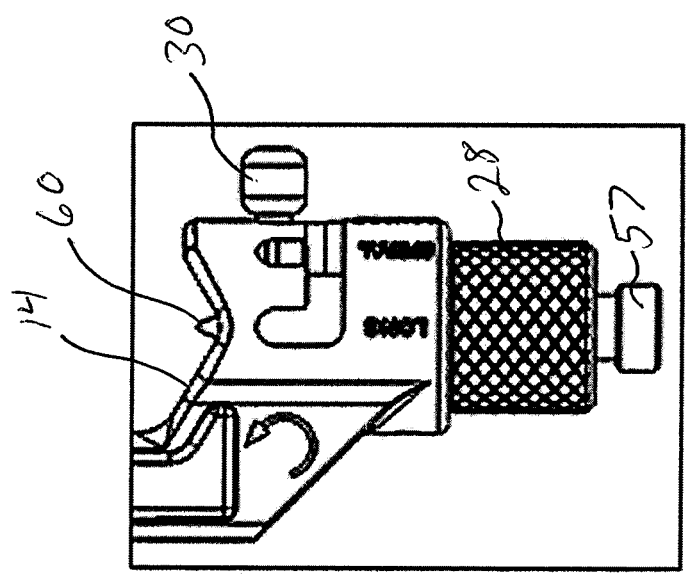
FIG. 24 is front elevational view of the blade and blade driving knob in the cutting position.

As shown in FIGS. 16 and 17, the stripping tool has an offset 94 between the knob axis 93 extending through the loading knob shaft 25 and the roller axis 96 extending through the roller wheel shaft 23, amplifying the rotational effect when the offset block rotates from tightening of the loading knob 18, make the clamping pressure more effective. This additional clamping pressure ensures the cable is tightly secured between the frame and roller and will not come loose during the cutting action. Typically, once the cable is loaded and the roller wheel 16 is sufficiently clamping the cable, the blade 60 will be raised to pierce the outer jacket.

Figure 31:
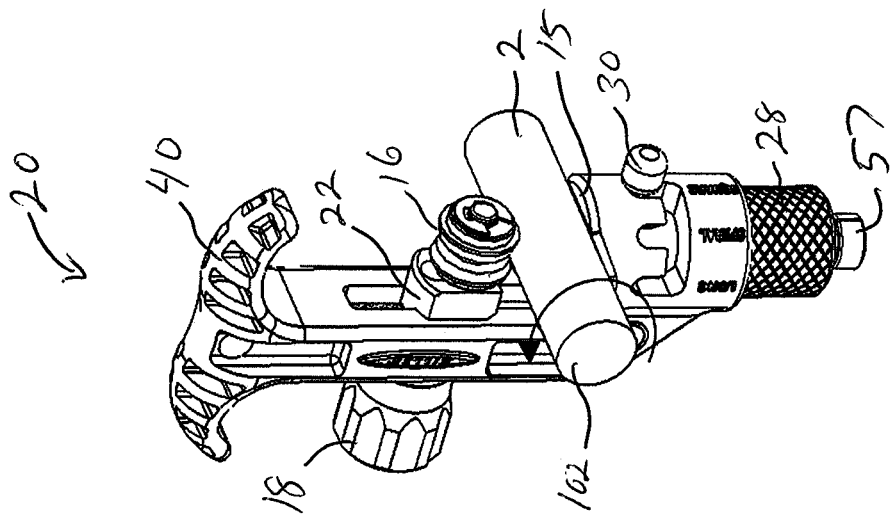
FIG. 31 is a rear top left perspective view of a cable loaded in the stripping tool with the position lever in a right-angle stripping position.
Figure 30:
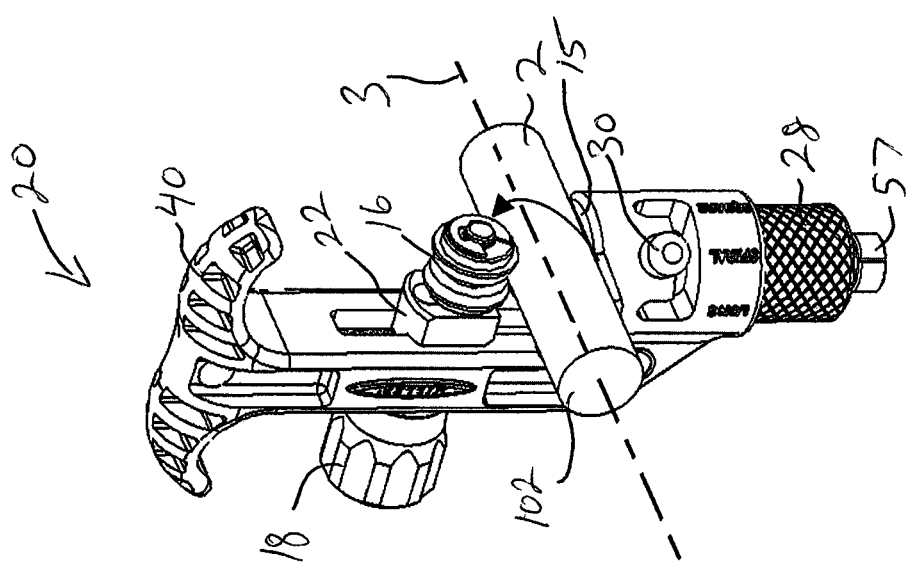
FIG. 30 is a rear top left perspective view of a cable loaded in the stripping tool with the position lever in a spiral stripping position.
Figure 29:
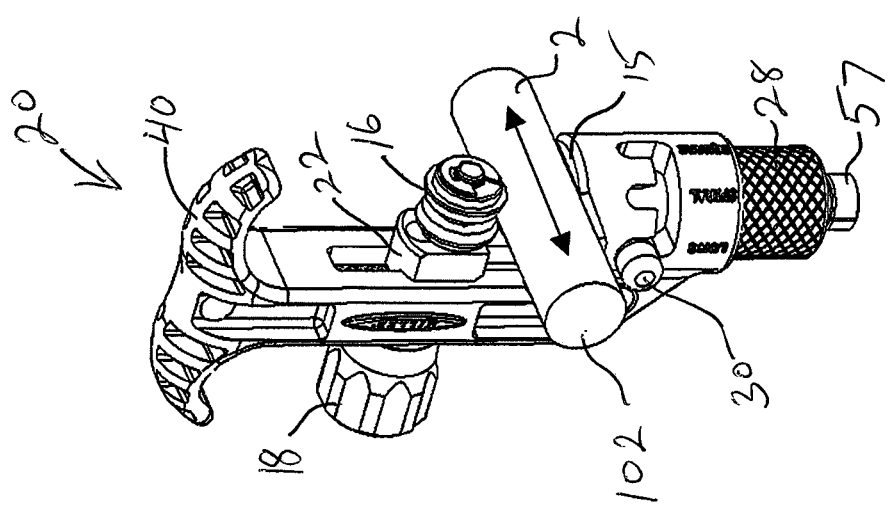
FIG. 29 is a rear top left perspective view of a cable loaded in the stripping tool with the position lever in a linear stripping position.

As shown in FIGS. 18-20 and 29-31, the stripping tool 20 includes a position lever 30 for securing blade 60 for changing the blade cutting direction, the position lever 30 movable to a first direction in a first notch 32 whereby the cable 2 is cut along the cable axis 3 (FIG. 29), to a second position in a second notch 34 whereby the cable 2 is cut in a spiral direction along the length of the cable 2 (FIG. 30) and to a third position in a third notch 36 whereby the cable 2 is cut along a circumference of the cable 2 (FIG. 31). The blade 60 is secured to a cylindrical blade receptacle 31, the blade receptacle 31 rotatably secured in a first cable support opening 33 extending through at least a lower portion of the cable support 14. The blade 60 extends through a second cable support opening 39 extending through at least an upper portion of the cable support 14, the second cable support opening 39 axially aligned with the first cable support opening 31. The second cable support opening 39 may have a smaller diameter than the first cable support opening 31.

The stripping tool includes a blade driving knob 28 attached at a first end of the tool frame 12 for moving the blade from a retracted position (FIG. 3B) to a cutting position (FIG. 3A) and a blade height adjustment knob 51 for adjusting the distance the blade 60 extends from the cable support surface 14 toward the cable.

The stripping tool 20 may include a handle 40 for holding, pulling or rotating the cable stripping tool 20 attached to a second end of the tool frame 12 opposite the first end of the tool frame 12. The tool frame 12 may be plastic or other structural material such as cast aluminum, which houses the roller assembly 24. The blade 60, blade driving knob 28, position lever 30 and blade height adjustment knob 51 make up the blade driving knob assembly 53, which can be operated to raise and rotate the blade 60. The blade direction can be changed by moving the position lever 30 so the tool will cut in a square (right angle for making a circular cut), longitudinal or spiral cutting pattern.

As shown above, the blade driving knob 28 is also used to raise and lower the blade 60. This allows the exposed tip or cutting edge 64 of the blade 60 to be temporarily lowered out of service and the cutting position can be changed with the cable still loaded into the tool frame. The blade driving knob assembly 53 may move the blade 60 up and down using a threaded interface or other linear engagement of the blade 60 with the blade driving knob assembly 53. The threaded interface provides mechanical advantage to raise the blade and pierce into very heavy jackets and armor as needed. The direction of the position lever 30 provides a visual indication of the blade orientation when the tool is engaged with the cable.

The tool 20 includes a spring-loaded roller assembly 24 which allows the end user to easily load the cable into the tool 20 and achieve a self-adjusting load position to ensure the roller 16 captures the cable. The frame 12 provides ergonomic support to allow the loading knob 18 to be used like a trigger to pull back the roller assembly 24. The spring 52 releases the roller assembly 24 onto the cable when the loading knob 18 is released. The tool knob 18 is rotated to tighten the roller assembly and fully secure the cable between the roller 16 and the cable support 14 disposed on the tool body or frame 12.

Figure 22:
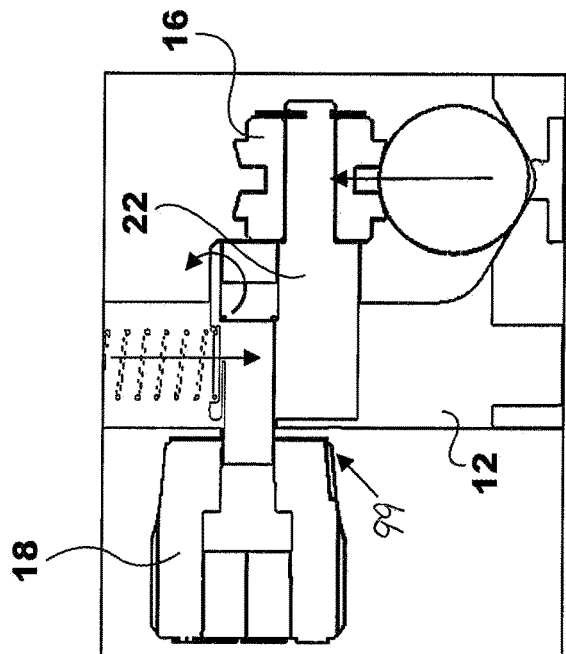
FIG. 22 is a front cross-sectional view of the offset block, loading knob and roller in a loosened loading position.
Figure 23:
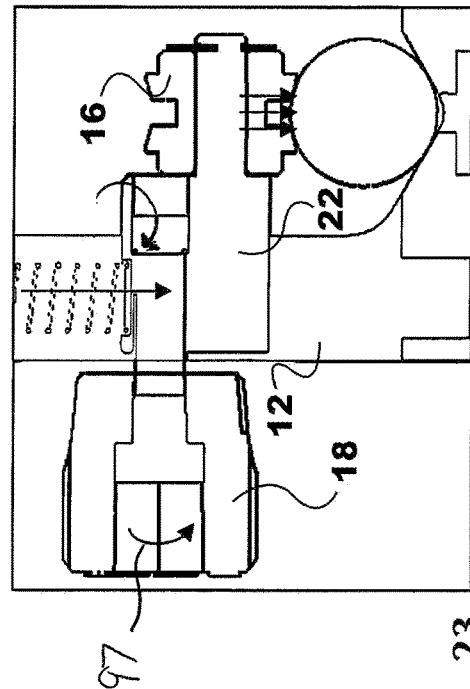
FIG. 23 is a front cross-sectional view of the offset block, loading knob and roller in a tightened stripping position.
Figure 21:
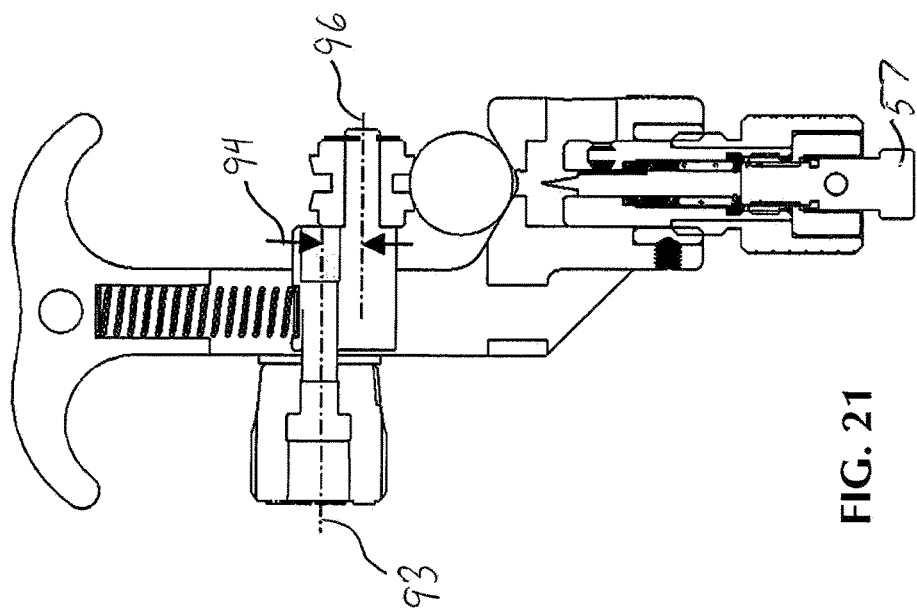
FIG. 21 is a front cross-sectional view of the cable stripping tool showing the loading knob offset with the roller.

As shown in FIGS. 22 and 23 and as described herein, the stripping tool 20 uses a gap 99 between the loading knob 18 and frame 12 to provide additional control of the pressure applied to the cable to secure the cable between the roller wheel 16 and the cable support 14. The gap 99 is present when the loading knob 18 is in a loosened position as shown in FIG. 22. The gap 99 is reduced as the loading knob is rotated in the loosening direction and as the loading knob is further rotated in the same direction, the gap 99 is eliminated. The stripping tool 20 includes the spring-loaded knob roller assembly 24. When the cable is initially loaded between the spring-loaded roller assembly 24 and the cable support 14 wherein the gap 99 between the loading knob 18 and frame 12 allows rotational misalignment of the roller assembly 24 in the direction of arrow 97 as the roller wheel 16 loads against the cable. Loosening of the loading knob 18 rotates the roller assembly 24 away from the cable as the spring-loaded action pushes the roller assembly 24 toward the cable. As the end user tightens the loading knob 18, the angular misalignment created by the offset loading knob 18 and roller axis 96 is reduced and a small and repeatable additional clamping pressure is applied. The additional pressure increases the effectiveness of the initial spring-loaded pressure.

The roller wheel 16 allows for a wide range of cable diameters. The roller angle is optimized to maintain tangential contact for the larger diameter and the smaller diameter utilizes a secondary contact zone and relief to allow smaller cables. This secondary diameter region also acts as a clearance groove to allow the roller to drop fully into the frame v-block (or cable support) without contacting the exposed tip of the blade. The roller also acts to reduce friction and resistance force during longitudinal and spiral cutting.

The blade has a conical profile which creates a sharp piercing tip and a sharp vertical cutting edge. The profile allows the tool to piece the heavy jacket, but still accurately perform the square, spiral and longitudinal cuts with a thick enough cross-section to withstand the service loads. The blade height is adjustable from outside the tool with a rotating blade height adjustment knob 28. The blade height adjustment knob 28 acts independent of the blade driving knob 57. The blade height is first adjusted to establish the depth of cut based on the cable diameter and wall thickness. Once the blade height is established, it does not need to be reset during the transition from square, spiral or longitudinal cutting operation. The blade height knob also has visible indicators to allow incremental and precise blade height setting and may include a tactile detent. The blade height adjustment knob 28 backs fully out for easy removal of the blade 60 for replacement.

The stripping tool 20 includes a spring-loaded cable support roller assembly 24 which lowers movement force and is self-locating for easy cable loading. The stripping tool 20 includes an offset axis clamping feature as part of spring-loaded support roller assembly. The frame 12 includes a T-handle 40 with a square cut ring 41 and hook hole 42.

The roller wheel 16 has two stage support geometry and blade cutout. A position lever changes the blade direction and provides visual indication of cutting direction. The blade may be a conical pierce/slitting blade. A tool-free blade height adjusting knob includes visible indicators for determining the knob position.

A blade driving assembly allows the blade to pierce though thick and durable outer cable sheath and allows blade cutting direction to be changed without removing the cable from the tool.

Figure 26:
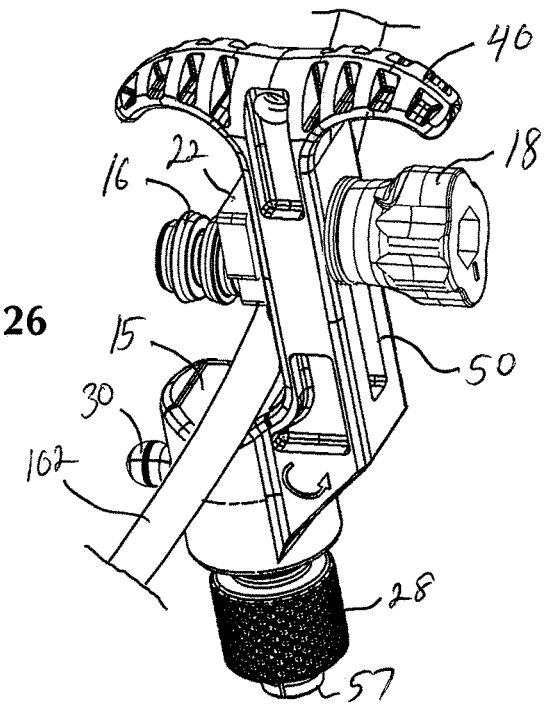
FIG. 26 is a rear top left perspective view of the stripping tool in a loading position.
Figure 27:
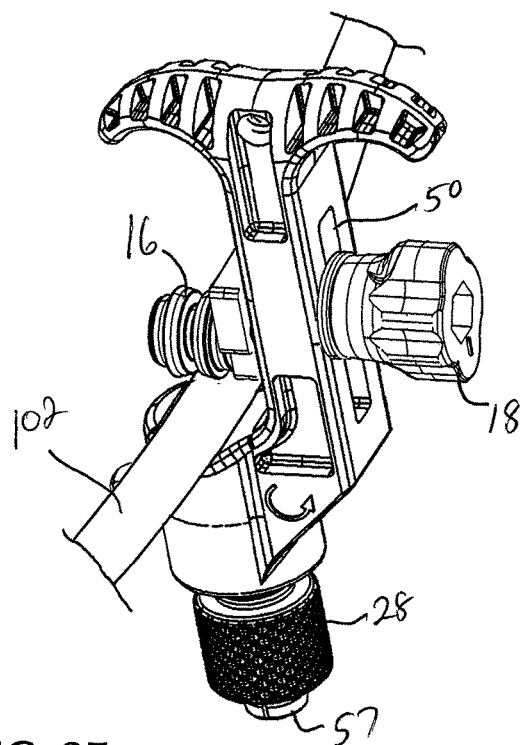
FIG. 27 is a rear top left perspective view of a small diameter cable loaded in the stripping tool with the roller in a stripping position appropriate for a small diameter cable.
Figure 28:
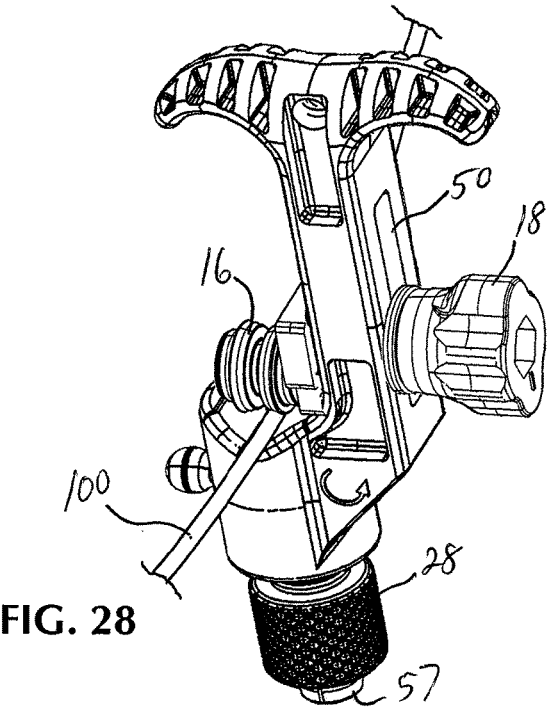
FIG. 28 is a rear top left perspective view of a large diameter cable loaded in the stripping tool with the roller in a stripping position appropriate for a large diameter cable.

In a method for using the stripping tool 20 shown in FIGS. 26 and 27, a user ensures the blade 60 is in the retracted position, urges the roller assembly 24 away from the cable support surface 15 for loading the cable 102 in the tool support surface 14 and once the cable 102 is loaded in the tool support surface 14, releases the roller assembly 24 whereby the roller wheel 16 secures the cable in position.

The user subsequently ensures the position lever 30 and blade height adjustment knob 28 are in the desired position and moves the blade 60 into the extended position by moving the blade driving knob 57 toward the blade height adjustment knob 28. The user then moves the tool 20 in either a rotational direction or a lateral direction to cut the cable outer jacket, moves the roller assembly 24 back to the loading position and removes the cable from the cable support 14.

Another method for using a cable stripping tool 20 for stripping a cable comprises ensuring the blade 60 is in a proper height position for slitting the cable jacket, ensuring the blade 60 is in the retracted position and ensuring the loading knob 28 is in a loosened position wherein a gap (see below) is formed between the loading knob 28 and the tool frame 12 and the roller assembly 24 is movable along the elongated slot 50. The method includes urging the loading knob 18 in a direction away from the cable support 14 and releasing the loading knob 18 to allow the spring 52 (FIG. 10) to force the roller assembly 24 against the cable jacket after which the spring 52 continues to move the offset block 22 to the end of the elongated slot 50 nearest the cable support 14 while maintaining the roller 16 against the cable, slightly rotating the entire roller assembly 24. The method includes tightening the loading knob 18 to rotate the roller assembly 24 back to a perpendicular position with respect to the tool frame 12, further tightening the roller 18 against the cable and preventing the roller assembly 24 from moving along the elongated opening 50, ensuring the position lever 30 is in a position to cut the cable jacket in the desired direction and rotating or pulling the stripping tool 20 with respect to the cable until the desired cut is made in the cable. The method includes loosening the loading knob 18 to release the roller assembly 24 from the secured position and removing the cable from the stripping tool 20. A portion of the sliced jacket may then be removed from the cable.

While the present invention has been particularly described, in conjunction with one or more specific embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A cable stripping tool for stripping the outer jacket of a cable having a length, the tool comprising:
   a tool frame having an elongated opening;
   a cable support disposed on the tool frame, the cable support including at least one support surface for maintaining the cable in a relative position when the tool is in a stripping position;
   a roller assembly including an offset block movable along the elongated opening, a roller wheel rotatingly attached to an end of the offset block adjacent the cable support and a loading knob attached to an opposite end of the offset block as the roller wheel such that said loading knob is offset from said roller wheel; and
   a blade having a cutting edge extendable from the cable support surface toward the cable.

2. The stripping tool of claim 1 wherein the blade cutting edge is rotatable between a first direction parallel to a length of the cable, a third direction perpendicular to the cable length and a second direction between the first direction and the third direction.

3. The stripping tool of claim 2 including a position lever secured to the blade for changing the blade cutting direction, the position lever movable between a first position whereby the cable jacket is cut along the cable axis, a second position whereby the cable jacket is cut in a spiral direction along the length of the cable and a third position whereby the cable jacket is cut perpendicular to the length of the cable.

4. The stripping tool of claim 3 wherein the tool frame includes a plurality of notches to secure the position lever in a plurality of locking positions including the first position, the second position and the third position.

5. The stripping tool of claim 1 wherein the blade cutting edge is a hyperbolic edge and the blade includes a piercing tip centered along the hyperbolic edge, the piercing tip capable of initially piercing the cable jacket and the hyperbolic edge slicing the cable jacket as the cable is moved with respect to the cable support.

6. The stripping tool of claim 1 wherein the roller assembly is capable of being moved away from the cable support surface for loading the cable in the cable support surface and, once the cable is loaded in the cable support, the roller assembly is capable of being released from the position away from the cable support surface whereby the roller wheel secures the cable in position.

7. The stripping tool of claim 6 including a spring which urges the roller assembly toward the cable support.

8. The stripping tool of claim 1 wherein loosening the loading knob causes a gap between the loading knob and the tool frame, allowing the offset block to wobble in the elongated opening and wherein upon release of the loading knob secures the cable between the cable support and the roller and subsequent tightening of the loading knob further increase the pressure placed on the cable from the cable support and roller.

9. The stripping tool of claim 1 including a blade driving knob attached at a first end of the tool frame for moving the blade from an extended position to a retracted position or for moving the blade from the retracted position to the extended position.

10. The stripping tool of claim 1 including a blade height adjustment knob for adjusting the distance the blade extends from the cable support toward the cable.

11. The stripping tool of claim 1 including a handle for holding, pulling or rotating the cable stripping tool, said handle attached to a second end of the tool frame opposite a first end of the tool frame.

12. The stripping tool of claim 1 including a blade driving knob attached at a first end of the tool frame for moving the blade from a retracted position to a cutting position and a blade height adjustment knob for adjusting the distance the blade extends from the cable support toward the cable.

13. The cable stripping tool of claim 1 wherein said roller assembly further includes a knob axis about which the loading knob rotates and a roller axis about which the roller wheel rotates, and wherein said knob axis and said roller axis are offset from each other.

14. A cable stripping tool for stripping the outer jacket of a cable having a length, the tool comprising:
    a tool frame having an elongated opening;
    a cable support disposed on the tool frame, the cable support including at least one support surface for maintaining the cable in a relative position when the tool is in a stripping position;
    a roller assembly including:
        an offset block movable along the elongated opening;
        a roller wheel rotatingly attached to a wheel shaft having a first axis along a length of the wheel shaft, the wheel shaft extending from one end of the offset block and extending adjacent to the cable support; and
        a loading knob rotatably attached to a second end of the offset block opposite the one end such that said loading knob is offset from said roller wheel; and
    a blade having a cutting edge extendable from the cable support surface toward the cable;
    wherein the offset block may wobble when the loading knob is in a loosened position such that the roller assembly rotates away from said cable and wherein the offset block is secured along the elongated opening when the loading knob is in a tightened position such that the roller assembly rotates towards said cable.

15. The cable stripping tool of claim 14 wherein said roller assembly further includes a knob axis about which the loading knob rotates and a roller axis about which the roller wheel rotates, and wherein said knob axis and said roller axis are offset from each other.

16. A cable stripping tool for stripping the outer jacket of a cable having a length, the tool comprising:
    a tool frame having an elongated opening;
    a cable support disposed on the tool frame for axially securing the cable to the tool frame;
    a blade having a cutting edge extendable from a surface of the cable support toward the cable; and
    a roller assembly including an offset block movable along the elongated opening and a roller wheel rotatingly attached to an end of a shaft adjacent the cable support and a loading knob rotatably attached to a second end of the offset block opposite the one end such that said loading knob is offset from said roller wheel, the roller wheel having:
        first and second conical drums spaced apart and axially aligned, each conical drum having an outer end having an outer diameter and an inner end having an inner diameter smaller than the first outer diameter and a conical roller surface between the inner and outer diameter ; and
        a cylindrical relief surface disposed between the inner end of the first and second conical drum, the cylindrical relief surface having a relief diameter smaller than a diameter of the conical roller surface;
        wherein the relief surface prevents the blade from contacting the roller wheel when the blade is in an extended position; and
        wherein a large diameter cable secured in the stripping tool contacts the conical roller surface of the first and second conical drum and a small diameter cable secured in the stripping tool contacts an edge of the first and second conical drum inner end.

17. The cable stripping tool of claim 16 wherein said roller assembly further includes a knob axis about which the loading knob rotates and a roller axis about which the roller wheel rotates, and wherein said knob axis and said roller axis are offset from each other.

18. A cable stripping tool for stripping the outer jacket of a cable having a length, the tool comprising:
    a tool frame having an elongated opening;
    a cable support disposed on the tool frame, the cable support including at least one support surface for maintaining the cable in a relative position when the tool is in a stripping position;
    a roller assembly including an offset block movable along the elongated opening, a roller wheel rotatingly attached to an end of the offset block adjacent the cable support and a loading knob rotatably attached to a second end of the offset block opposite the one end such that said loading knob is offset from said roller wheel; and a blade having a cutting edge extendable from the cable support surface toward the cable;

wherein the blade is rotatable to a first position, second position or third position wherein in the first position allows the blade to cut a jacket on the cable in a linear direction along the length of the cable, the second position allows the blade to cut the jacket in a spiral direction and the third position allows the blade to cut the jacket along a diameter of the cable.

19. The cable stripping tool of claim 18 wherein said roller assembly further includes a knob axis about which the loading knob rotates and a roller axis about which the roller wheel rotates, and wherein said knob axis and said roller axis are offset from each other.

20. A method for stripping the outer jacket from a cable comprising:

providing a cable stripping tool having a tool frame, an elongated opening on the tool frame, a cable support disposed on the tool frame, the cable support including at least one support surface for maintaining the cable in a relative position when the tool is in a stripping position, a roller assembly having an offset block movable along the elongated opening and a roller wheel rotatingly attached to a wheel shaft having a first axis along a length of the wheel shaft, the wheel shaft extending from one end of the offset block and extending adjacent to the cable support and a loading knob rotatably attached to a second end of the offset block opposite the one end such that said loading knob is offset from said roller wheel, the stripping tool including a blade having a cutting edge extendable from the cable support surface toward the cable, wherein the offset block may wobble when the loading knob is in a loosened position and the offset block is secured along the elongated slot when the loading knob is in the tightened position;

providing the cable for stripping a portion of the outer jacket therefrom;

ensuring the loading knob is in a loosened position wherein a gap is formed between the loading knob and the tool frame and the roller assembly is movable along the elongated opening;

urging the loading knob in a direction away from the cable support;

placing a cable against the cable support;

releasing the loading knob to allow a compression spring to force the roller assembly against the cable jacket after which the spring continues to urge the offset block to a slightly rotated position;

tightening the loading knob to rotate the roller assembly back to a perpendicular position with respect to the tool frame, further tightening the roller wheel against the cable;

extending the blade toward the cable;

moving the stripping tool with respect to the cable until the desired cut is made in the cable;

loosening the loading knob to release the roller assembly from the secured position;

removing the cable from the stripping tool; and removing a portion of the outer jacket from the cable.

21. The method of claim 20 wherein the stripping tool includes a position lever secured to the blade for changing the blade cutting direction, the position lever movable between a first position whereby the cable jacket is cut along the cable axis and a third position whereby the cable jacket is cut in a rotational direction along the diameter of the cable.

22. The method of claim 21 wherein the position lever is additionally rotatable to a second position between the first and third positions whereby the cable jacket is cut in a spiral direction along the length of the cable.

23. The method of claim 20 wherein said roller assembly further includes a knob axis about which the loading knob rotates and a roller axis about which the roller wheel rotates, and wherein said knob axis and said roller axis are offset from each other.

24. A method for using a cable stripping tool for stripping a cable comprising:

providing a cable stripping tool having a tool frame with an elongated opening, a cable support disposed on the tool frame, the cable support including at least one support surface for maintaining the cable in a relative position when the tool is in a stripping position, a roller assembly including a offset block movable along the elongated opening, a roller wheel rotatingly attached to an end of the offset block via a roller wheel shaft such that said roller wheel is adjacent the cable support, a loading knob attached to an opposite end of the offset block via a loading knob shaft such that said loading knob is offset from said roller wheel, said loading knob for securing the roller assembly in a position along the elongated opening and a spring for biasing the roller wheel in an active position against the cable, the roller assembly movable from a rest position to a loading position and to a stripping position and a blade having a cutting edge extendable from the cable support surface toward the cable, the blade cutting edge movable from a first direction parallel to a length of the cable to a second direction perpendicular to the cable length and at least one intermediate position between the first direction and the second direction, a position lever to the blade for changing the blade cutting direction, the position lever movable to a first direction whereby the cable is cut along a longitudinal axis of the cable, to a second position whereby the cable is cut in a spiral direction along the length of the cable and to a third position whereby the cable is cut along a circumference of the cable, a blade driving knob attached at a first end of the tool frame for moving the blade from a retracted position to a cutting position, a blade height adjustment knob for adjusting the distance the blade extends from the cable support toward the cable and a handle for holding, pulling or rotating the cable stripping tool attached to a second end of the tool frame opposite the first end of the tool frame;

ensuring the blade is in a proper height position for slitting the cable jacket;

ensuring the blade is in the retracted position;

ensuring the loading knob is in a loosened position wherein a gap is formed between the loading knob and the tool frame and the roller assembly is movable along the elongated opening;

urging the loading knob in a direction away from the cable support;

placing a cable in against the cable support;

releasing the loading knob to allow the spring to force the roller assembly against the cable jacket after which the spring urges con the offset block toward an end of the elongated slot opening nearest the cable support, bringing the roller wheel into position against the cable jacket such that the urging of the spring upon the offset block would tilt the roller assembly;

tightening the loading knob to rotate the roller assembly back to a perpendicular position with respect to the tool frame, further tightening the roller wheel against the cable;

ensuring the position lever is in a position to cut the cable jacket in the desired direction;

rotating or pulling the stripping tool with respect to the cable until the desired cut is made in the cable;

loosening the loading knob to release the roller assembly from the secured position; and removing the cable from the stripping tool.

25. The method of claim 24 wherein the step of ensuring the position lever is in a position to cut the cable jacket in the desired direction and the step of ensuring the blade is in a proper height position for slitting the cable jacket may be performed at any point before rotating or pulling the stripping tool with respect to the cable until the desired cut is made in the cable.

26. The method of claim 24 wherein said roller assembly further includes a knob axis about which the loading knob rotates and a roller axis about which the roller wheel rotates, and wherein said knob axis and said roller axis are offset from each other.

* * * * *